(12) United States Patent
Bodnar

(10) Patent No.: US 6,496,811 B1
(45) Date of Patent: Dec. 17, 2002

(54) FUZZY-LOGIC BASED OVERLOAD DETECTION AND CORRECTION FOR PACKET GATEWAYS

(75) Inventor: Bohdan Lew Bodnar, Park Ridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/563,057

(22) Filed: May 1, 2000

(51) Int. Cl.[7] .......................... G06G 7/00; G01R 31/08; H04J 3/24
(52) U.S. Cl. ........................... 706/3; 370/349; 370/232; 370/218
(58) Field of Search .............................. 706/3; 370/349, 370/232, 218

(56) References Cited

U.S. PATENT DOCUMENTS 5,691,975 A 11/1997 Hamada et al. ............. 370/232
2001/0024435 A1 * 9/2001 Birdwell et al. ............ 370/349

* cited by examiner

Primary Examiner—George B. Davis

(57) ABSTRACT

A fuzzy-logic based overload control for packet switches wherein a distribution curve is developed regarding the overload possibility versus receive packet stream processing rate. The transmit packet stream is measured and a processing rate of the receive packet stream is measured. An overload possibility value is manipulated according to the measured bursts of the transmit packet stream and a location on the distribution curve of the measured processing rate. Packets are dropped from the transmit stream if the overload possibility value is above a threshold.

17 Claims, 6 Drawing Sheets

FUZZY-LOGIC BASED OVERLOAD DETECTION AND CORRECTION FOR PACKET GATEWAYS

FIELD OF THE INVENTION

This invention relates generally to the field of packet switching and, more specifically, to packet switch overload control when real-time measurement of buffer occupancy is not possible.

BACKGROUND OF THE INVENTION

Communication transmission technology has evolved from analog voice and data circuits to 64 kbps pulse code modulated (PCM) encoded voice and data circuits to packetized voice and data. In fact, much of today's communication traffic is transmitted in the form of packets. In packet transmission, the voice stream or the data is broken into predetermined amounts of data (called "content" in the art), encapsulated with protocol data and transmitted through the packet network, which includes traversing one or more packet gateways or packet switches. The content is then reassembled at the destination and delivered to the end user.

As packet traffic increases, the possibility of overload in the packet gateways and switches increases dramatically. In a typical packet switch, packets are moved from one buffer (a "receive" buffer) to one of a plurality of "transmit" buffers. The buffer size is engineered to be a function of the load, the packet traffic statistics (such as packet sizes) and expected capacity of the output channel.

It is known, however, that transmission of packet data is "bursty" in nature. That is, packets do not arrive in a nice, orderly manner; packets arrive in bunches and the arrival period is often fractal in nature. As a result, it is possible for the transmit buffer, the receive buffer, or both, to overflow. Such overflow causes delay in delivery of the packets, which, in the case of data, results in lost packets and generally requires packet retransmission. In the case of packetized voice, such overflow causes voice quality degradation. Buffer overflow is generally called "overload".

One common method to monitor whether a packet switch is in overload is to count the number of packets queued in the transmit buffer. In many cases, however, it is not possible to count the number of queued packets because of the implementation of the buffer (i.e., the buffer is implemented inside of custom hardware). Usually, the only known factor is whether the buffer is empty or non-empty. Another common method to ameliorate overload is to give one packet stream priority over the others by giving or assigning one stream a higher priority and the other(s) a lower priority. For example, packetized voice is usually assigned a higher priority over packetized data to ensure timely delivery of the delay-sensitive voice packets. However, a priority system may cause the one or more lower priority streams to overflow when the higher priority stream is particularly bursty. As stated above, such overflow cannot be detected. Therefore, a problem in the art is that a packet switch may be in overload without the possibility of detection.

SUMMARY OF THE INVENTION

This problem is solved and a technical advance is achieved in the art by a system and method that implements fuzzy-logic based overload detection and correction for a packet gateway. According to a method of this invention, a distribution curve is developed regarding the packet switch's load at a desired maximum packet rate. According to further aspects of the invention, a determination is made if a first packet stream is excessively bursty. Further, the processing rates of all packet streams are measured. An overload possibility value is manipulated according to the burstyness of the first packet stream and a position on the distribution curve that the processing rates maps to. If the overload possibility value is above a threshold, then an overload condition is deemed to exist and packets are dropped from the transmit stream. This non-deterministic overload control runs at least once during the processing of the receive packet stream. Further, a transmit counter guarantees that the fuzzy-logic overload control runs during extended bursts.

BRIEF DESCRIPTION OF THE DRAWINGS

A more complete understanding of the invention may be obtained from consideration of the following description in conjunction with the drawings, in which.

DETAILED DESCRIPTION

A fuzzy-logic based overload control according to this invention operates in a processor of a packet gateway or packet switch having two (or more) packet streams, wherein one stream (a "first packet stream") has precedence over the other stream(s). The fuzzy-logic based overload control runs periodically and also runs when a packet burst is detected on the first packet stream. The fuzzy-logic based overload control manipulates an overload possibility value by mapping a short-term estimate of the second packet stream's processor utilization into a fuzzy region on a precalculated possibility curve and by determining if there is currently a burst occurring on the first stream. The un-normalized overload possibility value is generally lowered or not changed. The overload possibility value is only raised when a burst is currently occurring and the mapped fuzzy region of the possibility curve indicates a moderate to high possibility of overload. The fuzzy-logic based overload control determines a crisp number by comparing the overload possibility value to a threshold. If the overload possibility value is greater than or equal to the threshold, then an overload condition is highly possible and corrective action is taken. Corrective action includes dropping packets from the first stream. If the overload possibility value is less than the threshold, then an overload condition is not likely. Action is taken to ensure normal operation (packets in the first stream are sent to their destinations).

Figure 1:
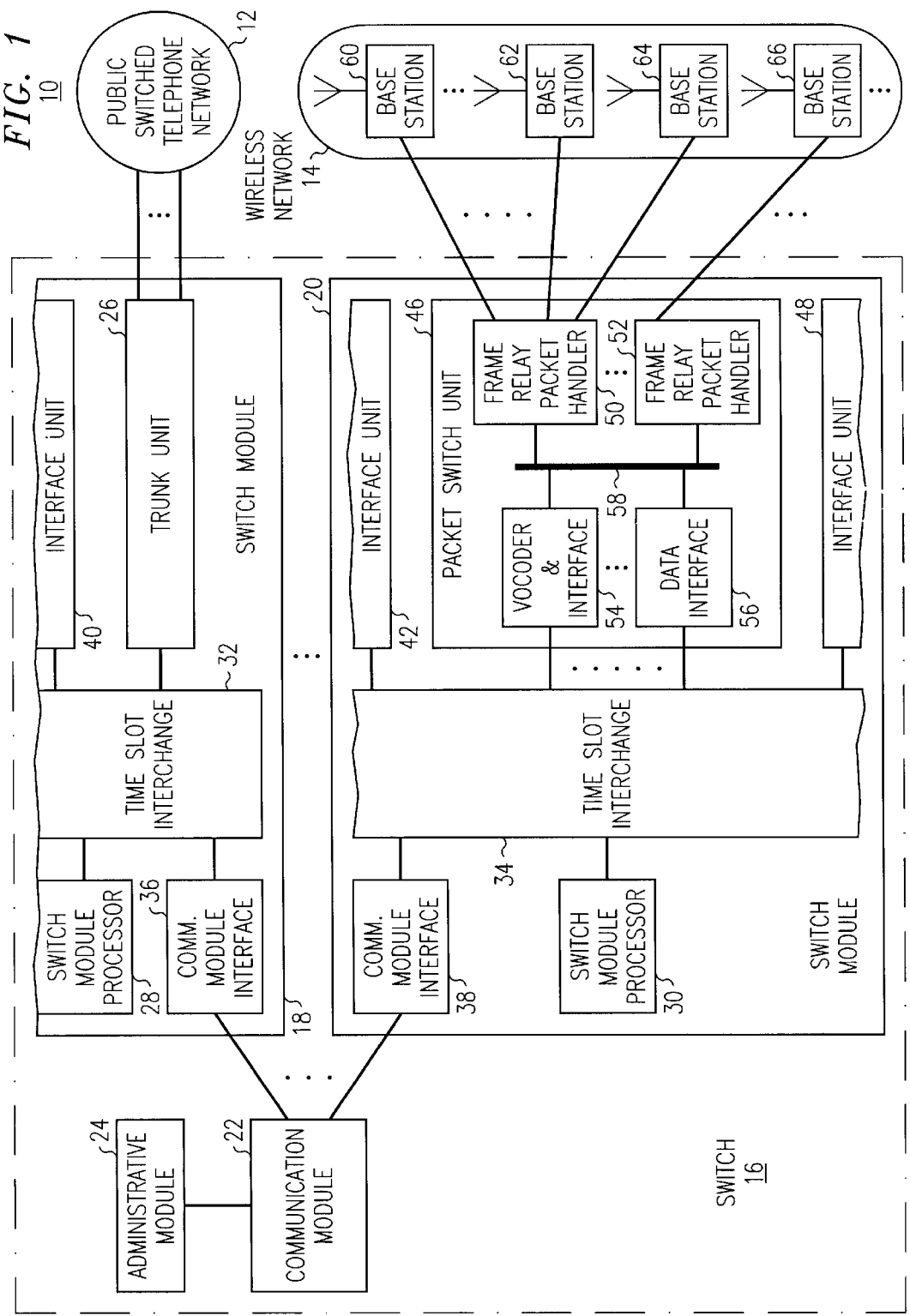
FIG. 1 is a block diagram of a switching system in which an exemplary embodiment of this invention is implemented.

FIG. 1 is an illustration of an exemplary switching system in which this inventive overload control may be implemented. FIG. 1 illustrates a block diagram of a telecommunications network 10 that includes a public switched telephone network 12 and a wireless network 14. Both are well known in the art. Connected to both networks 12 and 14 is a switch 16 such as a 5ESS® switch (manufactured by Lucent Technologies). The object of any switch is to connect a customer to a destination. Examples of such connections include between two telephones, between a wireless telephone and the telephone in the public switched PSTN 12, or between two wireless telephones in wireless network 14. Further, switch 16 connects data from data sources within wireless network 14 and public switched PSTN 12 among and between each other.

In this exemplary embodiment, switch 16 comprises a plurality of switch modules represented by switch module 18 and 20. All switch modules are interconnected by communication module 22 that acts as a hub, with the switch modules 18 and 20 and administration module 24 emanating therefrom. Switch module 18 terminates analog and/or digital subscriber lines through line units and analog or digital trunk units such as trunk unit 26. Administrative module 24 provides coordination of the functional components of switch 16 and human/machine interface.

Switch modules 18 and 20 each include a switch module processor 28 and 30, respectively, which provide control and coordination of the various components of switch modules 18 and 20. Each switch module 18 and 20 also includes a time slot interchange unit (TSI) 32 and 34, respectively, which provide interchange of 64 kbps PCM or 64 kbps clear channel among the units in switch modules 18 and 20. Switch modules 18 and 20 also include a communications interface module 36 and 38, respectively, which provide connectivity through communication module 22. Switch module 18 includes another type of interface unit 40 and switch module 20 includes interface units 42, 46 and 48.

Interface unit 46 comprises a packet switch unit (PSU), which includes a plurality of frame relay packet handlers (FRPH), represented by 50 and 52. There are usually more FRPH's but only two are shown for clarity. Interface unit 46 also includes interfaces to TSI 34 including vocoder interfaces 54 for translating packetized data into speech and data interface unit 56 which relays data received from FRPH's 50–52. PSU also includes a bus 58 to which the various components are connected. In the context of this exemplary embodiment, FRPH's 50–52 comprise "packet switches" and "gateways".

FRPH's 50 and 52 are each connected to a plurality of base stations in wireless network 14. FRPH 50 is shown connected to base stations 60, 62 and 64 and FRPH 52 is shown connected to base station 66. In an operating switching office, there would be more base stations supported and more FRPH's. As stated above, only a limited number are herein illustrated for clarity. FRPH's 50–52 perform a frame relay (packet switch or gateway) function; that is, they receive packets from base stations 60–66 and a delivery address from executive control processor (not shown but well known in the art) and used the delivery address to relay the packets on packet bus 58. Speech processors and data interfaces such as 54 and 56 "listen" to packets on the packet bus 48 by reading the delivery address, determine which packets are addressed to themselves, buffer the packets and translate these packets into switchable 64 kbps PCM. In the reverse direction, speech processors (such as in data interface 54 and 56) receive 64 kbps PCM uncoded speech or data translated into data packets appropriate for the wireless network (i.e., TDMA CDMA packets) and a delivery address, and send the packets out on bus 58. According to the prior art, frame relay packet handlers 50 and 52 may become overloaded without such condition being noted by overload control.

Figure 2:
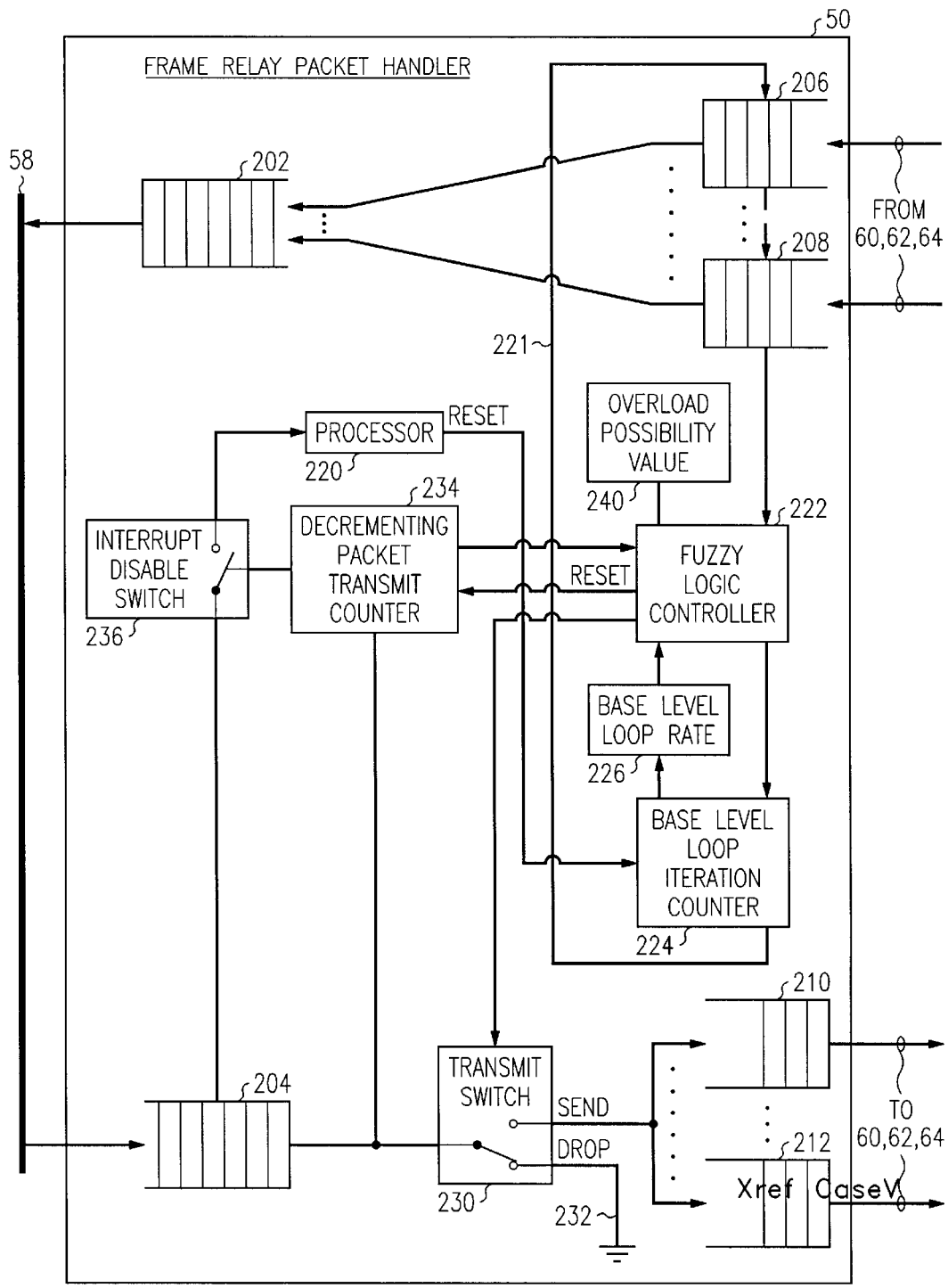
FIG. 2 is a block diagram of queuing in the packet switch of FIG. 1 according to an exemplary embodiment of this invention.

FIG. 2 is a functional block diagram of FRPH 50 employing an exemplary embodiment of this invention. According to this exemplary embodiment, packet bus 58 is connected to a composite transmit queue 202 and a composite receive queue 204 in FRPH 50. Transmit queue 202 receives packets from a plurality of traffic receive queues 206, 208 which receive packets from the base stations 60, 62 and 64 (FIG. 1). In the opposite direction, transmit queue 204 receives packets from packet bus 58, determines the destination of the packet and queues the packet into one of a plurality of transmit queues, represented by 210, 212, depending on the destination base station 60, 62, 64.

In the normal operation of FRPH 50, a processor 220 polls each receive queue 206–208, unloads one packet from each queue (if present) and sends the packet to the composite transmit queue 202 in its base level loop 221. After processor 220 examines all queues 206–208 in one iteration of this base level loop, it runs fuzzy-logic controller 222 according to an exemplary embodiment of this invention. Fuzzy-logic controller 222 determines whether an overload condition exists, as will be described further below. After fuzzy-logic controller 222 runs, a base level loop counter 224 is incremented and the base level loop loops back to queue 206 and processing in processor 220 continues in a like manner.

The value of base level loop counter 224 is loaded into a base level loop rate register 226 every 250 milliseconds according to this exemplary embodiment of this invention. Base level loop counter 224 is then set to zero. This action is caused by processor 220 generating an interrupt.

When a packet is received at transmit buffer 204, an interrupt is generated to processor 220. Processor 220 suspends base level loop processing 221 and causes the packet to be unloaded from transmit buffer 204. Processor 220 also determines which transmit queue 210–212 to deliver the packet to by reading a destination address field in the packet header. Conceptually, the packet moves through to a transmit switch 230. Transmit switch 230 either sends 231 the packet to continue to one of the transmit buffers 210–212 or causes packets to be dropped 232. Transmit switch 230 is under control of fuzzy logic controller 222. According to this exemplary embodiment, a transmit counter 234 is decremented each time a packet is unloaded from transmit buffer 204. If the value in the transmit counter 234 becomes equal to zero, interrupts from receive buffer 204 are disabled, as illustrated by switch 236, and control reverts to the base level loop 221 in processor 220. When there are no more packets to process in transmit buffer 204 (no interrupts generated), control also reverts to the base level loop 221 in processor 220. The probability that interrupts are disabled while packets are unloaded from queue 204 depends on traffic statistics, processor 220 speed and software characteristics. A slow processor 220 has a higher probability of disabling interrupts than a fast one, as will bursty traffic as opposed to less bursty traffic. Hence, the burst detection is self-adaptive with real-time processor speed and software real-time efficiency.

In a packet switch such as FRPH 50, it is common to have one path interrupt driven and the other polled. In the case of FRPH 50, it is important to move packets from the shared packet bus 58 (out of packet switch unit 46). Receive queue 204 cannot become fully loaded or over loaded, or else traffic on bus 58 comes to a halt until further packets can be moved into receive queue 204. Thus, receive queue 204 causes an interrupt to be generated to processor 220 in order to receive priority. However, if a burst of packets arrives at receive queue 204, then base level loop 221 does not run frequently enough to prevent receive queues 206–208 from overflowing.

Figure 3:
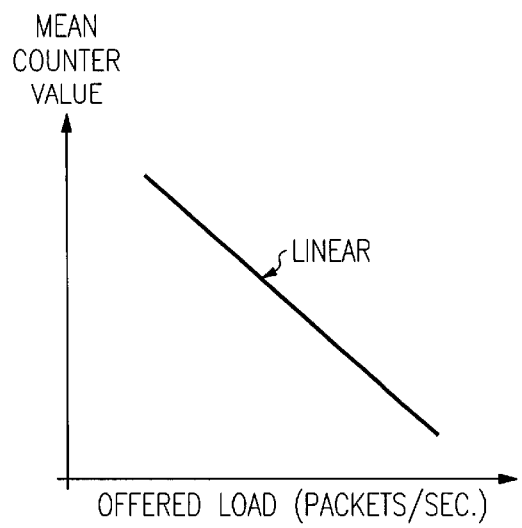
FIG. 3 illustrates a graph of load in packets per second versus the mean number of packets in the exemplary packet switch (frame relay packet handler) of FIG. 1.

Turning now to FIG. 3, a graph is presented of offered load in packets per second versus mean base level loop counter value 224 (FIG. 2). In this exemplary embodiment, the offered load is the packets received in receive queues 206–208 and receive queue 204. The mean counter value is the measured number of iterations of base level loop 221 at a predetermined sampling time. In this exemplary embodiment, the sampling time is 250 milliseconds. This graph shows that for the FRPH, utilization (U) thereof is $$U = 1 - kT_k/T_p. \quad (1)$$

K equals the average base level loop counter value at the end of the sampling period, $T_k$ equals the time required to update the counter and $T_p$ is the sampling period of time (250 milliseconds). The graph of this value is a linear function as shown in FIG. 3, which is a measure of the total occupancy of the packet switch.

Figure 4:
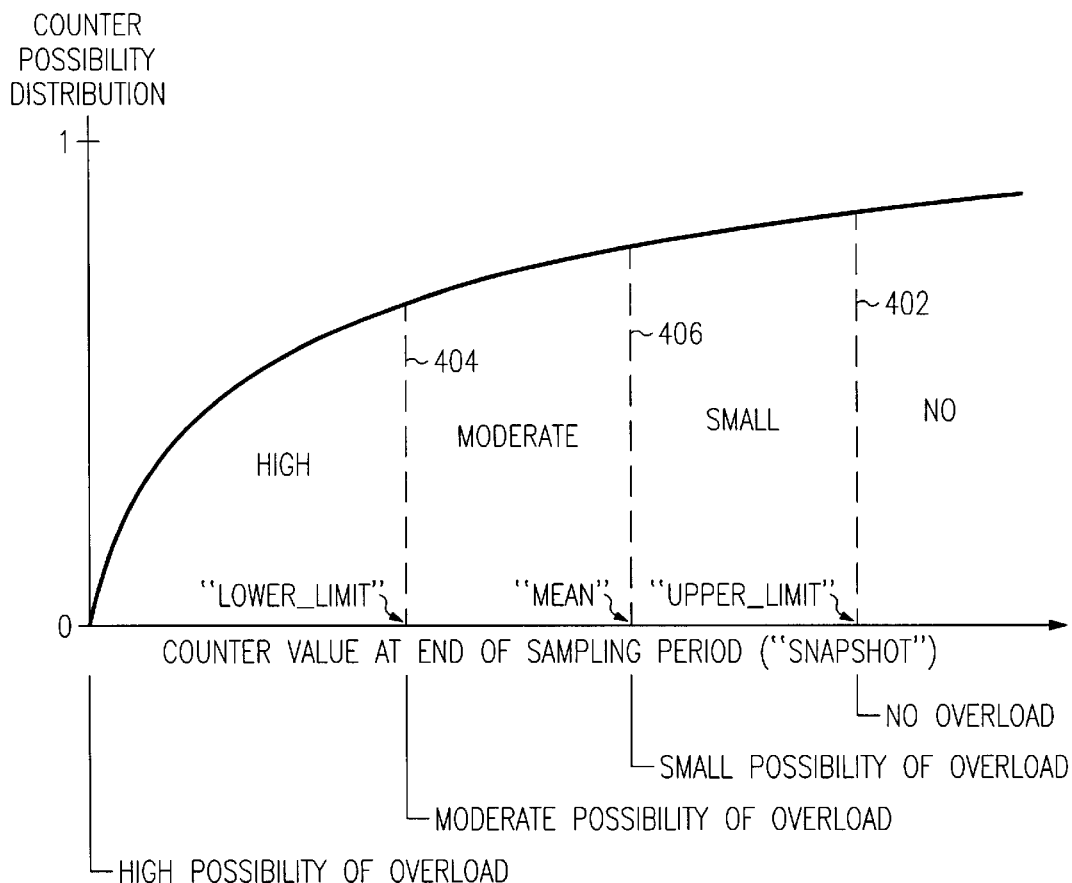
FIG. 4 is the possibility distribution function of a base level loop counter versus a specific load according to an exemplary embodiment of this invention.

Turning now to FIG. 4, a graph is shown of the base level loop counter 224 value at the end of a sampling period (a "snapshot," or a 250 millisecond time period of this exemplary embodiment) versus the counter probability distribution. Base level loop counter 224 (k in equation 1) is a random variable that will generally be different each time it is examined. The count of iterations of the base level loop 221 at the end of the sampling period will depend on the load, caching in processor 220 (if the processor is software based), packet size distribution and the sampling period. The curve of FIG. 4 illustrates the base level loop counter's probability distribution for a given load wherein the curve varies with load. In the probability distribution of zero to one, the counter probability value may be divided into four sections: high possibility of overload, moderate possibility of overload, small possibility of overload, and no possibility of overload. The fuzzy-logic controller 222 has three thresholds associated with this distribution: upper limit, lower limit, and mean as illustrated by lines 402, 404 and 406, respectively, in FIG. 4.

Figure 5:
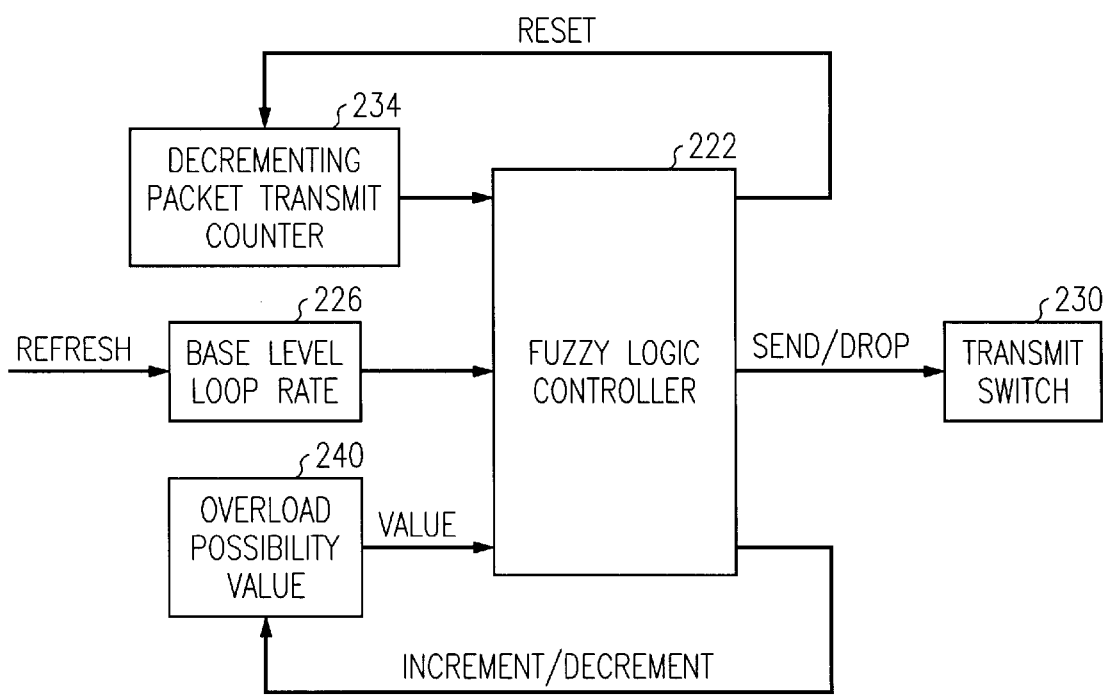
FIG. 5 is a block diagram of an exemplary fuzzy-logic overload controller of FIG. 4.

Turning now to FIG. 5, a block diagram of the fuzzy-logic controller 222 is shown. Fuzzy-logic controller 222 uses the value of transmit counter 234 and the base level loop rate 226 in order to determine the instantaneous load on the system (per the discussion of FIGS. 3 and 4). If the instantaneous load as determined by fuzzy-logic counter 222, is high (has reached zero), an overload possibility value 240 is used to determine whether this is a transient overload or an ongoing overload condition. The overload possibility value 240 is then incremented or decremented depending on the instantaneous load. The overload possibility value 240 conceptually "floats", with a predetermined tendency to "sink". Thus, when the fuzzy-logic controller runs as part of the base level loop, the overload possibility value 240 is lowered (less possibility of overload). If, however, the fuzzy-logic controller ran because the packet transmit counter disabled interrupts, then a burst has been detected. If a burst has been detected and the base level loop rate 226 is low, then the overload possibility value is raised. If the overload possibility value reaches a threshold value, overload is declared and transmit switch 230 is set to drop. Fuzzy-logic controller 222 resets transmit counter 234 each time through the decision cycle.

Figure 6:
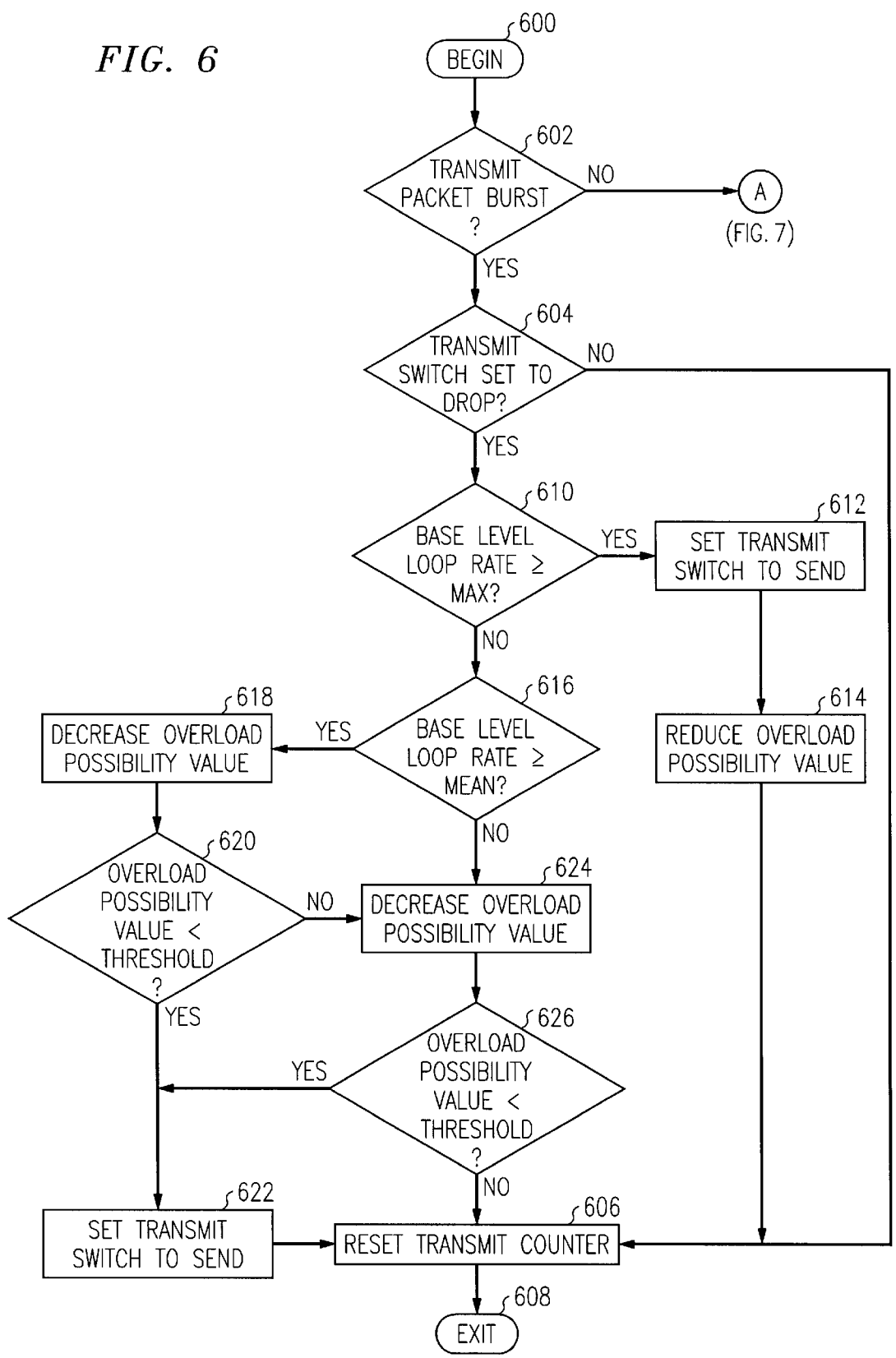
FIG. 6 is a flow chart of operation of the fuzzy-logic overload controller of FIG. 5
Figure 7:
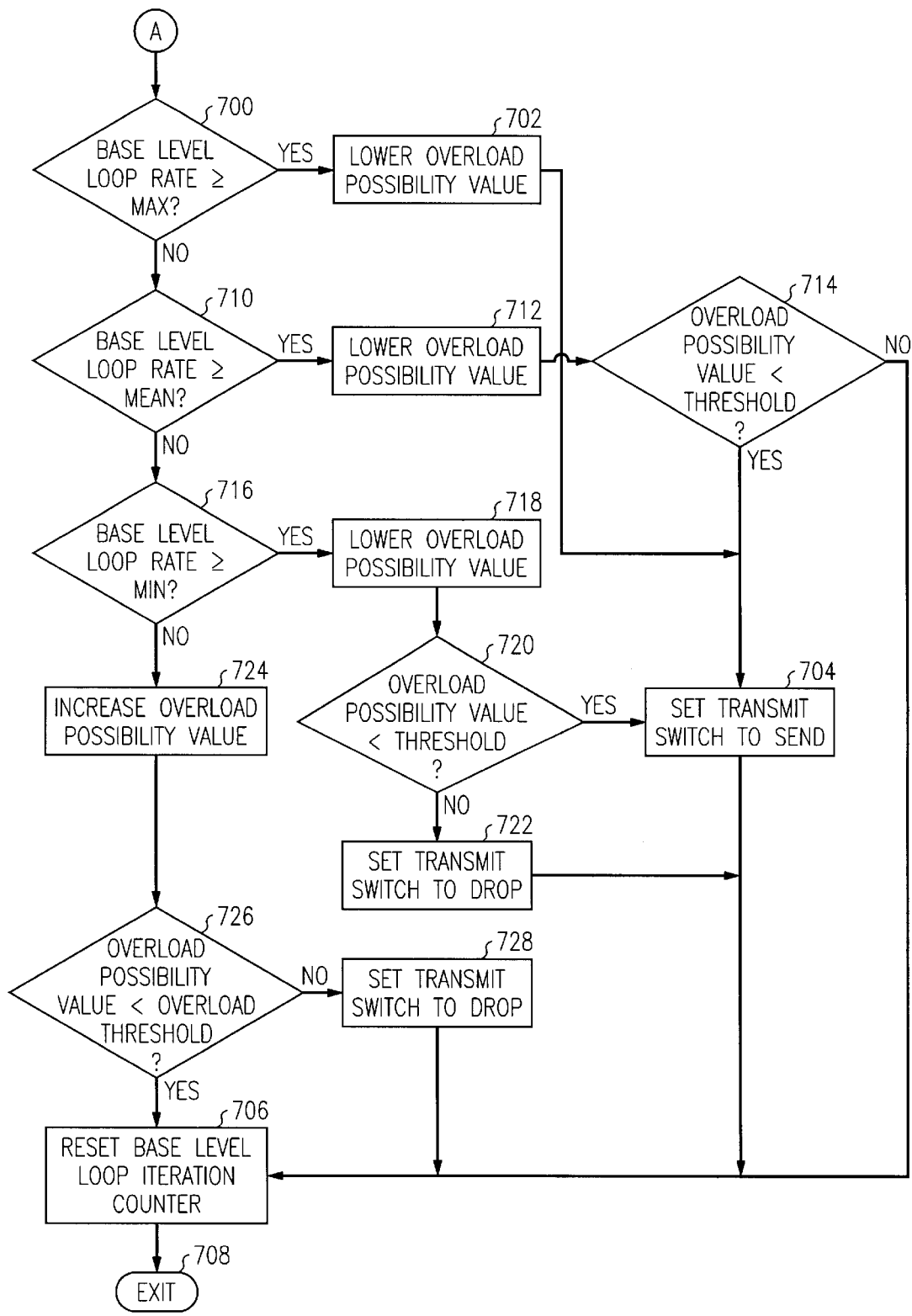
FIG. 7 is a continuation of the operation of the overload controller of FIG. 5.

Operation of fuzzy-logic controller 222 is shown in flowchart form in FIGS. 6 and 7. Turning now to FIG. 6, processing begins in oval 600 and proceeds to decision diamond 602. In decision diamond 602, a determination is made if the transmit counter 234 is greater than zero. If the transmit counter is equal to zero (transmit packet burst detected) then processing proceeds through connector A to FIG. 7.

If, in decision diamond 602, the transmit counter 234 is greater than zero (no packet burst) then processing proceeds to decision diamond 604 where a determination is made of the state of transmit switch 230. If the transmit switch 230 indicates send 231, (no previous overload) then processing proceeds to action box 606 where the transmit counter 234 is reset to the maximum value and processing ends at circle 608.

If, in decision diamond 604, the transmit switch 230 is set to drop 232 (overload previously declared), then processing proceeds to decision diamond 610 where a determination is made if the current value of the base level loop rate 226 is greater than or equal to an upper limit (402 of FIG. 4). If it is, the overload has passed because the base level loop is running frequently. The transmit switch 230 is set to send 231 in action box 612. Processing proceeds to action box 614 where overload possibility value 240 is lowered. Processing then proceeds through action box 606 and ends in circle 608.

If, in decision diamond 610, base level loop rate 226 is not greater than or equal to the upper limit, then a determination is made whether the base level loop rate 226 is greater than or equal to a mean value (406, FIG. 4). If it is, then the overload possibility value 240 is lowered. Processing then proceeds to decision diamond 620 where a determination is made whether the overload possibility value 240 is less than a threshold. If it is, then the overload has passed and the transmit switch 230 is set to send 231. Processing proceeds to action box 606. If it is not, then processing proceeds from decision diamond 620 to action box 624 where the overload possibility value 240 is lowered. A determination is made in decision diamond 626 whether overload possibility value 240 is less than a threshold. If it is, then the overload condition is over and processing proceeds to action box 622 where transmit switch 230 is set to send 231. Processing proceeds through action box 606 to exit 608. If, in decision diamond 626, overload possibility value 240 is not less than the threshold then the overload is still present and processing proceeds to reset the transmit counter in action box 606 and processing ends in circle 608.

Turning now to FIG. 7, processing enters from connector A, meaning that a burst is present in the first stream. Processing proceeds to decision diamond 700, where a determination is made if the base level loop rate 226 is greater than or equal to an upper limit (402, FIG. 4). If it is, then the overload possibility value 240 is lowered in action box 702. Processing proceeds to action box 704 where transmit switch 230 is set to send and then to action box 706 where transmit counter 234 is reset. Processing ends in circle 708.

If, in decision diamond 700, the base level loop rate 226 is not greater than or equal to the upper limit then processing proceeds to decision diamond 710 where a determination is made if the base level loop rate 226 is greater than or equal to a mean value (406, FIG. 4). If it is, then processing proceeds to action box 712 where the overload possibility value 240 is lowered. Processing proceeds to decision diamond 714 where a determination is made whether the overload possibility value 240 is less than a threshold. If it is, then processing proceeds to action box 704 where the transmit switch 230 is set to send 231, processing continues through action box 706 and ends in 708. If the overload possibility value 240 is not less than a threshold, processing proceeds to action box 706 where the transmit counter is reset and processing ends at circle 708.

If, in decision diamond 710, the base level loop rate 226 is not greater than or equal to the mean 406, then, in decision diamond 716 a determination is made if the base level loop rate 226 is greater than or equal to a lower limit (406, FIG. 4). If it is, then processing proceeds to action box 718 where the overload possibility value 240 is lowered. Processing then proceeds to decision diamond 720 where the overload possibility value 234 is checked to see if it is less than the threshold. If it is, then processing proceeds to action box 704 and processes from 704 through 708, as described above.

If, in decision diamond 720, the overload possibility value 240 is greater than or equal to the overload threshold, then the transmit switch 230 is set to drop 232. Processing then proceeds through action box 706 and exits at circle 708.

If, in decision diamond 716, the base level loop rate 226 is not greater than or equal to the lower limit (406, FIG. 4) then processing proceeds to action box 724 where the overload possibility value 240 is increased. A determination is then made in decision diamond 726 whether the overload possibility value is less than the overload threshold. If it is, then processing proceeds to action box 706 which resets the transmit counter and exits in 708. If it is not, then the transmit switch 230 is set to drop 232 in action box 728 and processing proceeds through action box 706 to circle 708.

The operation of the fuzzy-logic controller can be summarized as follows. A traffic burst in the transmit stream is used to trigger a determination of whether an overload condition may exist. The "burst" is from processor's 220 perspective; for the same traffic, a slow processor sees bursts more frequently than a fast processor. This is done by looking at the base level loop iterations for the past 250 ms. The iteration distribution at the desired maximum permitted load is mapped into four fuzzy regions (1) high possibility of overload, (2) moderate possibility, (3) low possibility, (4) no possibility, so that a traffic fluctuation does not cause the fuzzy-logic control to make an erroneous decision. An additional counter (item 240) is used to moderate this decision. This moderation is achieved by forcing the counter to keep track of the number of times a decision was made that an overload may exist. The counter value is an unnormalized possibility of overload. When the counter reaches its predetermined maximum value (threshold), the (crisp) value of set transmit switch to drop is set. Un-normalization is used in order to eliminate floating-point calculations. The counter's crisp values are 1 (drop packet) and zero (do not drop). Overload is declared only when a predetermined number of decisions affirming overload have been made. The counter is also used to determine whether no overload exists, whether traffic fluctuations are present (for example, a burst detection with a high counter value would be indicative of traffic fluctuations).

It is to be understood that the above-described embodiment is merely an illustrative principle of the invention and that many variations may be devised by those skilled in the art without departing from the scope of the invention. It is, therefore, intended that such variations be included within the scope of the claims.

What is claimed is:

1. A method for non-deterministic overload control for use in a packet handler, said packet handler serving a transmit packet stream and a receive packet stream, said method comprising the steps of:

a) developing a utilization probability distribution at the maximum desired load and the receive packet stream;

b) detecting a burst of said transmit packet stream;

c) measuring a processing rate of said receive packet stream;

d) manipulating an overload possibility value according to whether a burst was detected in said transmit packet stream and a location on the distribution curve of said utilization probability distribution; and e) dropping packets from said transmit packet stream if said overload possibility value is above a threshold.

2. A method for non-deterministic overload control in accordance with claim 1 wherein step e) further comprises sending all packets in said transmit packet stream if said overload possibility value is at or below the threshold.

3. A method for non-deterministic overload control in accordance with claim 2 further including repeating steps b) through e) according to the processing rate of said receive packet stream.

4. A method for non-deterministic overload control in accordance with claim 2 wherein step b) further includes causing steps c) through e) to execute when said detected burst is greater than a predetermining duration.

5. A method for non-deterministic overload control in accordance with claim 2 wherein step d) comprises lowering the overload possibility value when there is no burst in said transmitted packet stream and said processing rate of said receive packet stream is above the mean of said distribution curve.

6. A method for non-deterministic overload control in accordance with claim 2 wherein step d) comprises lowering the overload possibility value when there is no burst detected in said transmitted packet stream and said processing rate of said receive packet stream is around the mean of said distribution curve.

7. A method for non-deterministic overload control in accordance with claim 2 wherein step d) comprises lowering the overload possibility value when there is no burst detected in said transmitted packet stream and said processing rate of said receive packet stream is below the mean of said distribution curve.

8. A method for non-deterministic overload control in accordance with claim 2 wherein step d) comprises lowering the overload possibility value when there is a burst detected in said transmitted packet stream and said processing rate of said receive packet stream is above the mean of said distribution curve.

9. A method for non-deterministic overload control in accordance with claim 2 wherein step d) comprises lowering the overload possibility value when there is a burst detected in said transmitted packet stream and said processing rate of said receive packet stream is above the mean of said distribution curve.

10. A method for non-deterministic overload control in accordance with claim 2 wherein step d) comprises lowering the overload possibility value when there is a burst in said transmitted packet stream and said processing rate of said receive packet stream is around the mean of said distribution curve.

11. A method for non-deterministic overload control in accordance with claim 2 wherein step d) comprises raising the overload possibility value when there is a burst detected in said transmitted packet stream and said processing rate of said receive packet stream is below the mean of said distribution curve.

12. A non-deterministic overload control apparatus for use in a packet handler, said packet handler serving a transmit packet stream and a receive packet stream, said overload control comprising:

a packet transmit counter configured to measure bursts of said transmit packet stream;

a base level loop counter configured to measure a processing rate of said receive packet stream;

means for dropping packets from said transmit packet stream if said packet transmit counter measures a burst of said transmit packet stream and the processing rate is below a threshold.

13. An overload control apparatus according to claim 12 further including means for storing a base level loop rate value comprising the number of iterations of the base level loop every defined time.

14. An overload control apparatus according to claim 13 wherein an interrupt is generated when a packet is present is said packet transmit stream and wherein said packet transmit counter includes means for stopping said interrupt generation when the counter reaches a limit.

15. An overload control apparatus according to claim 13 wherein said base level loop counter includes base level loop rate means for periodically receiving a count of base level loop iterations from said base level loop counter.

16. An overload control apparatus according to claim 13 further including an overload possibility value means receiving as inputs said base level loop rate and said packet transmit counter.

17. An overload control apparatus according to claim 13 further including a fuzzy-logic controller configured to run once every base level loop iteration, that receives as inputs said base level loop rate and said packet transmit counter and manipulates said overload possibility value accordingly, said fuzzy-logic controller connected to said means for dropping packets to cause said means for dropping packets to drop packets when overload is probable, and to cause said means for dropping packets to deliver packets when overload is not probable.

* * * * *